United States Patent
Brands et al.

(10) Patent No.: US 9,577,711 B2
(45) Date of Patent: Feb. 21, 2017

(54) DISPLAY DEVICE, METHOD OF OPERATING A DISPLAY DEVICE, AND COMPUTER PROGRAM PRODUCT

(71) Applicant: NXP B.V., Eindhoven (NL)

(72) Inventors: Jan Rene Brands, Nijmegen (NL); Ruud J. G. van Heugten, Meijel (NL)

(73) Assignee: NXP B.V., Eindhoven (NL)

(*) Notice: Subject to any disclaimer, the term of this patent is extended or adjusted under 35 U.S.C. 154(b) by 120 days.

(21) Appl. No.: 14/331,134

(22) Filed: Jul. 14, 2014

(65) Prior Publication Data
US 2015/0042446 A1   Feb. 12, 2015

(30) Foreign Application Priority Data
Aug. 12, 2013  (EP) .................................. 13180057

(51) Int. Cl.
| | |
|---|---|
| *H04B 5/00* | (2006.01) |
| *G08B 5/22* | (2006.01) |
| *G06Q 30/02* | (2012.01) |
| *G06Q 30/00* | (2012.01) |
| *G06Q 90/00* | (2006.01) |
| *G06F 3/147* | (2006.01) |
| *H04W 4/00* | (2009.01) |
| *G06F 3/14* | (2006.01) |
| *G09G 5/12* | (2006.01) |

(52) U.S. Cl.
CPC ............ *H04B 5/0031* (2013.01); *G06F 3/147* (2013.01); *G06Q 30/02* (2013.01); *G06Q 30/0267* (2013.01); *G08B 5/22* (2013.01); *H04B 5/0056* (2013.01); *H04W 4/008* (2013.01); *G06F 3/1454* (2013.01); *G09G 5/12* (2013.01); *G09G 2380/04* (2013.01); *G09G 2380/06* (2013.01)

(58) Field of Classification Search
CPC ............ H04B 5/00; G08B 5/22; G06Q 30/02; G06Q 30/00; G06Q 90/00
USPC ........ 340/4.2, 10.1–10.5, 524, 8.1, 500–505; 455/557, 41, 1, 414.1; 709/224, 203, 219
See application file for complete search history.

(56) References Cited

U.S. PATENT DOCUMENTS

| | | | |
|---|---|---|---|
| 7,991,644 B2* | 8/2011 | Bryant | G06Q 30/02 705/14.64 |
| 8,126,505 B2 | 2/2012 | Tulloch | |

(Continued)

FOREIGN PATENT DOCUMENTS

| | | |
|---|---|---|
| CN | 201796390 U | 4/2011 |
| WO | 2012/173664 A1 | 12/2012 |

OTHER PUBLICATIONS

"DTAG100 Universal Dynamic NFC Tag", DTAG100, 4 pgs, retreived from the internet Jan. 21, 2014: http://www.dtag100.com (Feb. 20, 2013).

(Continued)

*Primary Examiner* — Nam V Nguyen

(57) ABSTRACT

There is provided a display device comprising a processing unit, a display unit coupled to the processing unit and a near field communication unit coupled to the processing unit, wherein said processing unit is arranged to synchronize display messages to be displayed by the display unit with corresponding near field communication messages to be stored in the near field communication unit. Furthermore, a corresponding method of operating a display device is conceived. Furthermore, a corresponding computer program product is provided.

19 Claims, 2 Drawing Sheets

(56) References Cited

U.S. PATENT DOCUMENTS

| | | | | |
|---|---|---|---|---|
| 8,593,255 | B2* | 11/2013 | Pang | G06K 7/10019 340/10.1 |
| 8,934,835 | B2* | 1/2015 | Deluca | H04M 1/72522 340/10.1 |
| 8,965,785 | B2* | 2/2015 | Lee | G06Q 30/0241 705/14.4 |
| 9,100,426 | B1* | 8/2015 | Fang | G06F 21/50 |
| 9,223,750 | B2* | 12/2015 | Liu | G06F 17/00 |
| 2002/0116268 | A1* | 8/2002 | Fukuda | G06Q 30/02 709/201 |
| 2007/0203796 | A1* | 8/2007 | Riggs | G06Q 20/206 705/18 |
| 2011/0320293 | A1* | 12/2011 | Khan | G06Q 20/0457 705/16 |
| 2012/0072943 | A1* | 3/2012 | Pan | H04N 21/4126 725/23 |
| 2012/0094597 | A1* | 4/2012 | Tysowski | G06Q 30/06 455/41.1 |
| 2012/0094598 | A1* | 4/2012 | Tysowski | H04W 4/001 455/41.1 |
| 2012/0173318 | A1* | 7/2012 | Lee | G06Q 30/0241 705/14.4 |
| 2012/0252480 | A1* | 10/2012 | Krutt | H04B 5/0056 455/456.1 |
| 2013/0080221 | A1 | 3/2013 | Lin et al. | |
| 2013/0085822 | A1 | 4/2013 | Azami | |
| 2014/0252083 | A1* | 9/2014 | Lee | G06Q 30/0241 235/375 |

OTHER PUBLICATIONS

"HyTech—Dynamically Changing the URL on a NFC Tag via a Local Webserver", Hytech, 6 pgs, retrieved from the internet Jan. 21, 2014 at: http://techblog.hybris.com/2013/02/20/dynamically-changing-the-url-on-a-nfc-tag-via-a-local-webserver/ (Jan. 20, 2013).

"NFC-Enabled Digital Advertising Displays to Roll Out in U.S. Malls", NFC Times, 4 pgs, retrieved from the internet: http://nfctimes.com/news/nfc-enabled-digital-advertising-displays-roll-out-us-malls (Mar. 13, 2013).

Extended European Search Report for Patent Appln. No. 13180057.5 (Jan. 28, 2014).

"Digital Signage", Wikipedia, 10 pgs, retrieved from the internet Jul. 7, 2014 at: http://en.wikipedia.org/wiki/Digital_signage (2012).

"Second Screen", Wikipedia, 5 pgs, retrieved from the internet Jul. 7, 2014 at: http://en.wikipedia.org/wiki/Second_screen (2012).

"Narrowcasting", Wikipedia, 3 pgs, retrieved from the internet Jul. 7, 2014 at: http://en.wikipedia.org/wiki/Narrowcasting (2012).

"QR code", Wikipedia, 19 pgs, retrieved from the internet Jul. 7, 2014 at: http://en.wikipedia.org/wiki/Qr_code (2012).

"QR and NFC Living in Harmony?" 8 pgs, retrieved from the internet Jul. 7, 2014 at: http://shkspr.mobi/blog/2012/12/qr-and-nfc-living-in-harmony/ (Oct. 12, 2012).

"Smart Posters—How to use NFC tags and readers to create interactive experiences that benefit both consumers and businesses" NFC Forum Inc, 25 pgs (Apr. 2011).

"NTAG I$^2$C, NFC Forum type 2 Tag compliant IC with I$^2$C interface", NXP, 13 pgs: retrieved from the internet at: http://www.nxp.com/documents/short_data_sheet/NT3H1101_1201_SDS.pdf (Dec. 2013).

"NFC Forum Type 2 Tag compliant IC with 144 bytes user memory and field detection", NXP, 32 pgs, retrieved from the internet at: http://www.nxp.com/documents/data_sheet/NTAG203F.pdf (Oct. 2013).

NXP NFC Tag ICs NTAG21x—$2^{nd}$ generation NTAG enables mass-market NFC applications, NXP, 2 pgs, retrieved from the internet at: http://nxp-rfid.com/wp-content/uploads/2013/07/NTAG_210_ $_{212}$_low.pdf (2013).

* cited by examiner

DISPLAY DEVICE, METHOD OF OPERATING A DISPLAY DEVICE, AND COMPUTER PROGRAM PRODUCT

CROSS-REFERENCE TO RELATED APPLICATIONS

This application claims the priority under 35 U.S.C. §119 of European patent application no. 13180057.5, filed on Aug. 12, 2013, the contents of which are incorporated by reference herein.

FIELD

The present disclosure relates to a display device. Furthermore, the present disclosure relates to a method of operating a display device. Furthermore, the present disclosure relates to a computer program product.

BACKGROUND

Today, digital signage contributes significantly to marketing and advertisement campaigns worldwide. Digital signage makes use of electronic display devices, such as smart posters, in order to display, among others, advertising messages at retail stores, hotels, restaurants, corporate buildings, metro stations, airports, and many more locations.

Traditional advertising posters and billboards can easily be equipped with near field communication (NFC) tags, so that they effectively become NFC-enabled smart posters. It is relatively easy to attach an NFC tag containing the required content to a poster if the content displayed on the poster, for example an advertising message, is static. The NFC tag will then contain, for example, a uniform resource locator (URL) to the website of the company or the product in the advertising message. In that case, the website may be accessed automatically when a user taps the NFC tag with an NFC-enabled mobile device. However, with newer digital signage, which features a sequence or stream (narrowcasting) of advertising messages, this is no longer possible. As the displayed message changes, the content of an accompanying NFC tag should—but does not—change accordingly.

This problem persists even if the NFC tag contains a URL that points to a particular website that somehow "knows" which content is currently being displayed and redirects the user to the proper URL for that advertising message. Since the URL may be opened by the NFC-enabled mobile device at a later moment in time, in which case the content that is currently being shown may not be the content that the user was interested in, it cannot be guaranteed that the correct website is opened. For example, opening the URL at a later moment in time may be necessary in case the smart poster is located where the internet connectivity is relatively low. As another example, the smart poster may comprise a stand-alone display system that is started at some point in time; in that case the exact advertising message that is being shown at a particular moment in time cannot be known outside the system itself.

U.S. Pat. No. 8,126,505 B2 describes an NFC-enabled telecommunications communication device that is mounted behind the touch point of a smart poster. The content data downloadable from the smart poster is managed remotely, monitored and usage data of the smart poster analyzed at a server via the telecommunications device. Furthermore, a method is described to remotely synchronize visual images displayed on a display of the smart poster with the content output from an NFC device of the smart poster. However, this synchronization is performed under control of a remote server, and therefore requires and depends on a connection to said remote server.

SUMMARY

There is provided a display device comprising a processing unit, a display unit coupled to the processing unit and a near field communication unit coupled to the processing unit, wherein said processing unit is arranged to synchronize display messages to be displayed by the display unit with corresponding near field communication messages to be stored in the near field communication unit.

According to an illustrative embodiment, the processing unit is arranged to synchronize the display messages with the corresponding near field communication messages by simultaneously rendering the display messages on the display unit and writing the corresponding near field communication messages to the near field communication unit.

According to another illustrative embodiment, the display messages and the corresponding near field communication messages are comprised in a data stream. According to a further illustrative embodiment, the display messages and the corresponding near field communication messages are comprised in a data file.

According to a further illustrative embodiment, the processing unit is arranged to use timing information for synchronizing the display messages with the corresponding near field communication messages.

According to a further illustrative embodiment, the processing unit is arranged to extract the display messages and the corresponding near field communication messages from different channels comprised in a single data source.

According to a further illustrative embodiment, the processing unit is arranged to include an identifier of the display device into at least one of the near field communication messages.

According to a further illustrative embodiment, the near field communication unit is arranged to signal a read out of a particular near field communication message to the processing unit.

According to a further illustrative embodiment, the near field communication unit is coupled to the processing unit via a wired interface.

According to a further illustrative embodiment, at least one of the display messages comprises advertising content.

Furthermore, a smart poster is provided that comprises a display device of the kind set forth.

Furthermore, there is conceived a method of operating a display device, said display device comprising a processing unit, a display unit coupled to the processing unit and a near field communication unit coupled to the processing unit, wherein said processing unit synchronizes display messages to be displayed by the display unit with corresponding near field communication messages to be stored in the near field communication unit.

Furthermore, there is provided a computer program product comprising instructions that, when being executed by a processing unit, carry out or control at least a part of a method of the kind set forth.

DESCRIPTION OF DRAWINGS

Embodiments will be described in more detail with reference to the appended drawings, in which.

DESCRIPTION OF EMBODIMENTS

Figure 1:
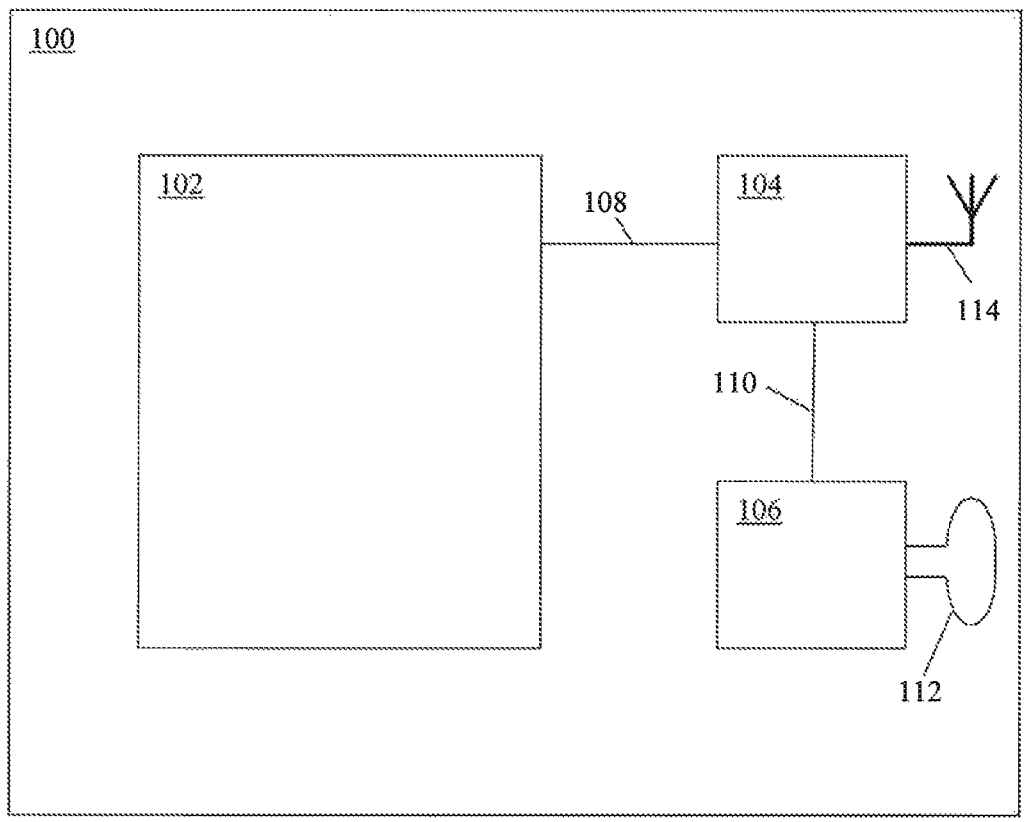
FIG. 1 shows an illustrative embodiment of a display device.

FIG. 1 shows an illustrative embodiment of a display device. The display device 100 comprises a display unit 102 coupled to a processing unit 104, for example via a wired connection 108. The processing unit 104 is coupled to an NFC unit 106; this coupling may also be realized as a wired connection 110, for example an I²C connection. The NFC unit 106 may be a so-called NFC tag. The NFC unit 106 may comprise an NFC antenna 112. Furthermore, the display device 100, in particular the processing unit 104, may be connected to a back-end system (not shown) via a back-end connection established by a long-range antenna 114, for example.

In operation, the processing unit 104 synchronizes display messages to be displayed by the display unit 102 with corresponding NFC messages to be stored in the NFC unit 106. Thereby, it is achieved that a particular NFC message read out from the NFC unit 106 by an external NFC-enabled mobile device at a specific moment in time, effectively relates to the content shown by the display unit 102 at that specific moment in time. For example, if the NFC message contains a URL pointing to a particular website, then the correct website may be opened by the NFC-enabled mobile device.

More specifically, the NFC unit 106 may be a so-called connected NFC tag, for example a tag of the NTAG I²C family of NFC tags produced by NXP Semiconductors. The word "connected" as used herein refers to the fact that the NFC tag has a wired connection to a host device. For example, in the illustrative embodiment shown in FIG. 1, the NFC unit 106 is coupled to the processing unit 104 via a wired connection 110. The wired connection 110 facilitates data exchange between the processing unit 104 and the NFC unit 106, in particular the writing of NFC messages to said tag. The processing unit 104 may, for example, comprise a microcontroller unit or a relatively simple personal computer.

In operation, the processing unit 104 may execute a computer program that simultaneously renders display messages (for example advertising messages) on the display unit 102 and writes accompanying contents to the NFC unit 106, i.e. corresponding NFC messages. The display messages and the corresponding NFC messages may be comprised in a data stream received from a back-end system (not shown). Alternatively or in addition, the display messages and the corresponding NFC messages may be comprised in a data file stored in a memory unit (not shown) of the display device 100. It is noted that, in case of a data stream, the stream does not need to be delivered in real-time. In particular, the data stream may also be buffered by the display device 100, or the display device 100 may comprise an internal data-stream generating component (not shown) which does not require a connection to a back-end system. In case of a data file, a connection to a back-end system is not required either.

Furthermore, the processing unit 104 may use timing information for synchronizing the display messages with the corresponding NFC messages. In that case, the NFC messages may be comprised in a separate file, i.e. a file different from the file containing the display messages. This concept is similar to a separate file with a subtitle track for a video file. The processing unit 104 may also extract the display messages and the corresponding NFC messages from parallel channels in a single data source. Thus, the NFC messages may be embedded within a file or stream that also contains the display messages, i.e. in a separate channel parallel to the display messages. This concept is similar to a video file with an embedded subtitle track.

If the data source is a data stream, it may either be sent to the display device 100 in real-time (which is called "narrowcasting") or be read from an internal memory unit (not shown or a removable storage medium (not shown), such as a USB memory stick or an SD-card memory. In the first case, the NFC messages need to be embedded within the data stream. In the second case, the NFC messages may either be included in one or more separate data files or embedded within the display data file(s). In both cases, the contents of the NFC unit 106 will be updated according to what is being shown by the display unit 102. In other words, the contents of the NFC unit 106 change dynamically and are synchronized to what is being shown. Also, when a particular NFC message is read out from the NFC unit 106 by an external device, the NFC message (e.g. a URL) can be accessed at a later moment in time. In that case, the external device will nevertheless show information (e.g. a website) which effectively relates to what was being shown on the display when the NFC unit 106 was being read out.

An NFC message that contains a website URL may be enhanced by embedding an identifier which uniquely identifies the display device 100 into it. This allows a web server to collect or generate statistic data that reflect the effectiveness and/or popularity of the display message corresponding to said NFC message. As a result, in case of a streaming-based system, the back-end system may fine-tune or improve the occurrence or frequency of a displayed advertising message or show other or more variants of the particular message by adjusting the data stream accordingly.

Furthermore, the NFC unit 106 may signal to the processing unit 104 whenever the NFC message is being read out. In this way, statistic data may also be generated by the display device 100. The presentation of the display messages may also be adjusted or improved by the computer program that renders the display messages. For example, a sound may be generated or an additional message may be displayed (overlaid on the display message) in order to thank the user who read the NFC unit 106 for his/her interest, or to encourage him/her to actually visit the website or otherwise consume the obtained content.

It is noted that the above-described synchronization of display messages with corresponding NFC messages also enables the use of an NFC-enabled mobile device as a "second screen", i.e. a screen in addition to the screen of the display unit 102. The owner of the mobile device may then interact with the content being displayed, e.g. via a web interface in the mobile device's web browser or by installing a dedicated computer program (a so-called "app") on the mobile device.

Furthermore, the skilled person will appreciate that the NFC unit 106 may also be a different NFC device. In other words, the NFC unit 106 is not necessarily an NFC tag. For example, the NFC unit 106 may also comprise an NFC peer-to-peer interface.

Figure 2:
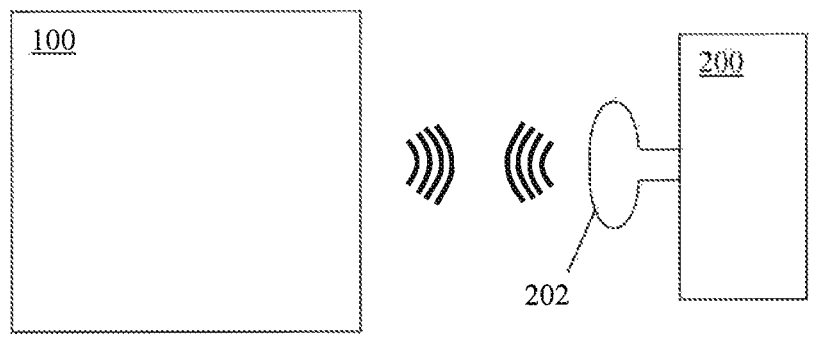
FIG. 2 shows an illustrative communication between a display device and a mobile device.

FIG. 2 shows an illustrative communication between a display device and a mobile device. In particular, a display device 100 as shown in FIG. 1 communicates with an external mobile device 200 that is equipped with an NFC antenna 202 in order to establish near field communication with the display device 100.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 display device
102 display unit
104 processing unit
106 NFC unit
108 connection
110 connection
112 NFC antenna
114 long-range antenna
200 mobile device
202 NFC antenna

The invention claimed is:

1. A display device comprising:
a processing unit;
a display unit coupled to the processing unit; and
a near field communication (NFC) unit coupled to the processing unit, wherein said processing unit is configured to extract display messages and corresponding NFC messages from parallel channels in a single data source, the corresponding NFC messages uniquely identify the display device and are embedded within a file or stream that also contains the display messages, and synchronize display messages to be displayed by the display unit with corresponding NFC messages stored in the NFC unit and read by an external NFC-enabled mobile device.

2. The display device as claimed in claim 1, wherein the processing unit is configured to synchronize the display messages with the corresponding NFC messages by simultaneously rendering the display messages on the display unit and writing the corresponding NFC messages to the NFC unit.

3. The display device as claimed in claim 1, wherein the display messages and the corresponding NFC messages are comprised in a data stream.

4. The display device as claimed in claim 1, wherein the processing unit is configured to use timing information for synchronizing the display messages with the corresponding NFC messages.

5. The display device as claimed in claim 1, wherein the near field communication unit is configured to signal a read out of a particular NFC message to the processing unit.

6. The display device as claimed in claim 1, wherein the NFC unit is coupled to the processing unit via a wired interface.

7. The display device as claimed in claim 1, wherein at least one of the display messages comprises advertising content.

8. The display device of claim 1, wherein a first wired connection couples the display unit to the processing unit.

9. The display device of claim 8, wherein a second wired connection couples the processing unit to the NFC unit.

10. The display device of claim 9, wherein the second wired connection is an Inter-Integrated Circuit (fC) connection.

11. The display device of claim 1, wherein the external NFC-enabled mobile device is configured to be used as a second screen in addition to a first screen of the display unit.

12. The display device of claim 1, wherein the display device is configured to generate statistic data that can be collected by a web server based upon the unique identifier of the display device.

13. A smart poster comprising the display device as claimed in claim 1.

14. A method of operating a display device, said display device comprising a processing unit, a display unit coupled to the processing unit and a near field communication (NFC) unit coupled to the processing unit, the method comprising:
extracting, with the processing unit, display messages and corresponding NFC messages from parallel channels in a single data source, wherein the corresponding NFC messages are embedded within a file or stream that also contains the display messages; and
synchronizing, with the processing unit, display messages to be displayed by the display unit with corresponding NFC messages stored in the NFC unit and read by an external NFC-enabled mobile device.

15. The method of claim 14, further comprising:
configuring the external NFC-enabled mobile device to be used as a second screen in addition to a first screen of the display unit.

16. The method of claim 14, further comprising:
generating statistic data that can be collected by a web server based upon the unique identifier of the display device.

17. A non-transitory tangible computer program product encoded with a computer program comprising instructions that, when being executed by a processing unit, performs a method of operating a display device, comprising:
instructions for extracting, with the processing unit, display messages and corresponding near field communication (NFC) messages from parallel channels in a single data source, wherein the corresponding NFC messages uniquely identify the display device are embedded within a file or stream that also contains the display messages; and
instructions for synchronizing, with the processing unit, the display messages to be displayed by a display unit with corresponding NFC messages stored in a NFC unit and read by an external NFC-enabled mobile device.

18. The non-transitory tangible computer program product of claim 17, further comprising:

instructions for configuring the external NFC-enabled mobile device to be used as a second screen in addition to a first screen of the display unit.

19. The non-transitory tangible computer program product of claim 17, instructions for generating statistic data that can be collected by a web server based upon the unique identifier of the display device.

* * * * *